(12) United States Patent
Kim et al.

(10) Patent No.: US 12,553,950 B2
(45) Date of Patent: Feb. 17, 2026

(54) BATTERY PROFILE GENERATING APPARATUS AND BATTERY PROFILE GENERATING METHOD

(71) Applicant: LG ENERGY SOLUTION, LTD., Seoul (KR)

(72) Inventors: Ji-Yeon Kim, Daejeon (KR); Young-Deok Kim, Daejeon (KR); Jun-Cheol Park, Daejeon (KR); Soon-Ju Choi, Daejeon (KR)

(73) Assignee: LG ENERGY SOLUTION, LTD., Seoul (KR)

( * ) Notice: Subject to any disclaimer, the term of this patent is extended or adjusted under 35 U.S.C. 154(b) by 0 days.

(21) Appl. No.: 19/036,926

(22) Filed: Jan. 24, 2025

(65) Prior Publication Data

US 2025/0244390 A1     Jul. 31, 2025

(30) Foreign Application Priority Data

Jan. 31, 2024    (KR) .................. 10-2024-0015219

(51) Int. Cl.
    *G01R 31/374*      (2019.01)
    *G01K 3/00*         (2006.01)
               (Continued)

(52) U.S. Cl.
    CPC ........... *G01R 31/374* (2019.01); *G01K 3/005* (2013.01); *G01R 31/3842* (2019.01);
                      (Continued)

(58) Field of Classification Search
    None
    See application file for complete search history.

(56) References Cited

U.S. PATENT DOCUMENTS 9,840,161 B2    12/2017   Chikkannanavar et al.
10,534,028 B2    1/2020   Stewart et al.
(Continued)

FOREIGN PATENT DOCUMENTS

EP         4425646 A1    9/2024
EP         4465061 A1    11/2024
(Continued)

OTHER PUBLICATIONS

Hyeong-Wook Park et al., Analysis of Change in Battery Parameters according to Ambient Temperature and C-rate, Journal of the Korean Institute of Illuminating and Electrical Installation Engineers, 2022, 36(12) : 24-32.
(Continued)

*Primary Examiner* — Jas A Sanghera
(74) *Attorney, Agent, or Firm* — Bryan Cave Leighton Paisner LLP (57) ABSTRACT

A battery profile generating apparatus includes: a charging/discharging unit configured to charge and discharge a battery; a measurement unit configured to measure battery information that includes at least one of the voltage, current, and temperature of the battery during the charging/discharging process; and a control unit. The control unit is configured to: determine a target temperature and a target C-rate corresponding to charging/discharging conditions based on a preset reference profile that represents the correspondence between a threshold temperature and a threshold C-rate; control the charging/discharging unit to charge or discharge the battery at the target C-rate when the battery temperature corresponds to the target temperature; and generate a battery profile corresponding to the battery based on the battery information.

14 Claims, 7 Drawing Sheets

(51) Int. Cl.
  *G01R 31/3842* (2019.01)
  *H01M 10/42* (2006.01)
  *H01M 10/46* (2006.01)
  *H01M 10/48* (2006.01)
(52) U.S. Cl.
  CPC ..... *H01M 10/425* (2013.01); *H01M 10/4285* (2013.01); *H01M 10/46* (2013.01); *H01M 10/486* (2013.01)

(56) References Cited

U.S. PATENT DOCUMENTS

| | | | |
|---|---|---|---|
| 2013/0209846 A1* | 8/2013 | Lev | H01M 10/482 |
| | | | 429/90 |
| 2014/0266060 A1* | 9/2014 | Ying | H02J 7/005 |
| | | | 320/134 |
| 2017/0108552 A1 | 4/2017 | Roumi et al. | |
| 2017/0205468 A1* | 7/2017 | Park | H01M 10/425 |
| 2017/0250548 A1* | 8/2017 | Eo | H02J 7/007194 |
| 2018/0145531 A1 | 5/2018 | Jung et al. | |
| 2023/0039356 A1 | 2/2023 | Jee et al. | |
| 2023/0160971 A1 | 5/2023 | Cha et al. | |
| 2023/0184843 A1 | 6/2023 | Bae et al. | |
| 2023/0275449 A1 | 8/2023 | Cha et al. | |
| 2024/0266859 A1 | 8/2024 | Kim et al. | |
| 2024/0339684 A1* | 10/2024 | Landesfeind | H02J 7/007192 |
| 2025/0044364 A1 | 2/2025 | Kim et al. | |

FOREIGN PATENT DOCUMENTS

| | | |
|---|---|---|
| JP | 2021034320 A | 3/2021 |
| KR | 10-2018-0056238 A | 5/2018 |
| KR | 10-2022-0009918 A | 1/2022 |
| KR | 10-2022-0054105 A | 5/2022 |
| KR | 10-2022-0065604 A | 5/2022 |
| KR | 10-2022-0107550 A | 8/2022 |
| KR | 10-2023-0115117 A | 8/2023 |
| KR | 10-2023-0161073 A | 11/2023 |
| KR | 10-2600139 B1 | 11/2023 |
| KR | 10-2023-0174640 A | 12/2023 |
| KR | 10-2024-0032627 A | 3/2024 |

OTHER PUBLICATIONS

Schindler et al., "Kinetic accommodation in Li-ion mechanistic modeling", Journal of Power Sources 440 (2019).

* cited by examiner

| THRESHOLD TEMPERATURE | T1 | T2 | T3 | T4 | T5 | T6 |
|---|---|---|---|---|---|---|
| THRESHOLD C-RATE | 0.05C | 0.1C | 0.13C | 0.2C | 0.23C | 0.33C |

BATTERY PROFILE GENERATING APPARATUS AND BATTERY PROFILE GENERATING METHOD

CROSS-REFERENCE TO PRIOR APPLICATION(S)

This application claims priority to Korean Patent Application No. 10-2024-0015219, filed Jan. 31, 2024, the entire content of which is hereby expressly incorporated by reference herein in its entirety, as if fully set forth herein.

TECHNICAL FIELD

The present disclosure relates to a battery profile generating apparatus and a battery profile generating method.

BACKGROUND

Recently, as the demand for portable electronic products such as laptops, video cameras, and portable phones has rapidly increased, and as the development of electric vehicles, energy storage batteries, robots, and satellites has begun in earnest, research on repeatedly chargeable/dischargeable high-performance batteries is actively underway.

Currently commercialized batteries include, for example, nickel cadmium batteries, nickel hydrogen batteries, nickel zinc batteries, and lithium batteries. Among these, the lithium batteries have gained attention because of their advantages, such as exhibiting almost no memory effect compared to the nickel-based batteries, unrestricted charging and discharging, substantially low self-discharge rate, and high energy density.

While research is being conducted to enhance the capacity and density of these batteries, improving their lifespan and safety is also important. To enhance the safety of a battery, a technology capable of accurately diagnosing the current state of the battery is required.

One method for diagnosing the state of a battery is to analyze a battery profile representing the charging/discharging characteristics of the battery. For example, the state of a battery has been diagnosed by measuring the capacity and voltage of the battery during the process of charging the battery and analyzing the battery profile representing the correspondence between the measured capacity and voltage.

Here, to diagnose the state of a battery more accurately, a battery profile that precisely reflects the state of the battery is required. However, obtaining such a battery profile requires low-rate charging/discharging, such as 0.05 C (C-rate). For example, when charging or discharging a battery at 0.33 C or higher, the obtained battery profile may include an overpotential, causing the battery profile to inaccurately reflect the current state of the battery due to the influence of the overpotential.

That is, in conventional methods, low-rate charging/discharging is required to accurately diagnose the state of a battery, thereby imposing limitations on diagnosing the state of the battery.

SUMMARY

The present disclosure provides a battery profile generating apparatus and method capable of generating a battery profile that relatively accurately reflects the state of a battery in a relatively short time.

Various aspects of the present disclosure may be understood through the following description and will become more apparent from the embodiments of the present disclosure. In addition, it will be readily understood that various aspects of the present disclosure may be implemented by the means and combinations thereof as described in the claims.

A battery profile generating apparatus according to an aspect of the present disclosure may include: a charging/discharging unit configured to charge and discharge a battery; a measurement unit configured to measure battery information that includes at least one of the voltage, current, and temperature of the battery during the charging/discharging process; and a control unit. The control unit may be configured to: determine a target temperature and a target C-rate corresponding to charging/discharging conditions based on a preset reference profile that represents the correspondence between a threshold temperature and a threshold C-rate; control the charging/discharging unit to charge or discharge the battery at the target C-rate when the battery temperature corresponds to the target temperature; and generate a battery profile corresponding to the battery based on the battery information.

The charging/discharging conditions may be set to include the target temperature.

The control unit may be configured to determine a threshold C-rate corresponding to the target temperature from the reference profile as the target C-rate.

The control unit may be configured to determine the minimum C-rate, maximum C-rate, or intermediate C-rate from among the one or more threshold C-rates corresponding to threshold temperatures from the reference profile that are lower than the target temperature, as the target C-rate.

The charging/discharging conditions may be set to include the target C-rate.

The control unit may be configured to determine a threshold temperature corresponding to the target C-rate from the reference profile as the target temperature.

The control unit may be configured to: select one or more threshold temperatures corresponding to threshold C-rates from the reference profile that are greater than the target C-rate; and determine the minimum temperature, maximum temperature, or intermediate temperature from among the selected one or more threshold temperatures, as the target temperature.

The charging/discharging conditions may be set to include the target temperature and the target C-rate.

The control unit may be configured to: determine the charging/discharging suitability according to the target temperature and the target C-rate based on the reference profile; and control the charging/discharging unit to charge or discharge the battery when the charging/discharging is determined to be suitable.

The control unit may be configured to: determine the threshold C-rate corresponding to the target temperature from the reference profile as a reference C-rate; and determine that the charging/discharging is suitable when the reference C-rate is equal to or greater than the target C-rate.

The control unit may be configured to: determine the threshold temperature corresponding to the target C-rate from the reference profile as a reference temperature; and determine that the charging/discharging is suitable when the reference temperature is equal to or less than the target temperature.

The battery profile generating apparatus may further include a temperature regulating unit configured to regulate the battery temperature.

The control unit may be configured to control the temperature regulating unit until the battery temperature reaches the target temperature when the battery temperature does not correspond to the target temperature.

The control unit may be configured to provide information about the battery by outputting the battery profile externally.

A battery pack, according to another aspect of the present disclosure, may include the battery profile generating apparatus according to an aspect of the present disclosure.

A diagnostic device according to another aspect of the present disclosure may include the battery profile generating apparatus, according to an aspect of the present disclosure.

A battery profile generating method, according to another aspect of the present disclosure, may include: determining a target temperature and a target C-rate corresponding to charging/discharging conditions based on a preset reference profile that represents the correspondence between a threshold temperature and a threshold C-rate; controlling a charging/discharging unit to charge or discharge the battery at the target C-rate when the battery temperature corresponds to the target temperature; and generating a battery profile corresponding to the battery based on battery information that includes at least one of the voltage, current, and temperature of the battery.

A non-transitory computer-readable storage medium, according to another aspect of the present disclosure, may store a program that executes a battery profile generating method. The method includes: determining a target temperature and a target C-rate corresponding to charging/discharging conditions based on a preset reference profile that represents the correspondence between a threshold temperature and a threshold C-rate; controlling a charging/discharging unit to charge or discharge the battery at the target C-rate when the battery temperature corresponds to the target temperature; and generating a battery profile corresponding to the battery based on battery information that includes at least one of the voltage, current, and temperature of the battery.

According to an aspect of the present disclosure, the battery profile generating apparatus may reduce the time required to generate a battery profile while improving the accuracy of the battery profile by determining a target temperature and a target C-rate that correspond to each other.

The effects of the present disclosure are not limited to those mentioned above, and other effects not mentioned above will be clearly understood by persons ordinarily skilled in the art from the claims.

BRIEF DESCRIPTION OF THE DRAWINGS

The following drawings attached hereto exemplify the embodiments of the present disclosure and serve to further understand the technical idea of the present disclosure together with the detailed description of the disclosure to be described later. Therefore, the present disclosure should not be construed as being limited to the matters illustrated in the drawings.

DETAILED DESCRIPTION

The terms or words used in the specification and claims should not be construed as limited to their ordinary or dictionary meanings, but should be construed as having meanings and concepts consistent with the technical idea of the present disclosure based on the principle that an inventor may appropriately define the concepts of terms in order to explain his or her own invention in the best way.

Accordingly, the embodiments described in this specification and the configurations illustrated in the drawings are merely some of the embodiments of the present disclosure, and do not represent all the technical ideas of the present disclosure. Therefore, it should be understood that, at the time of filing the present application, various equivalents and modifications that can replace these embodiments may exist.

In describing the present disclosure, detailed explanations of related known functions and configurations will be omitted when it is determined that such detailed explanations may obscure the gist of the present disclosure.

Terms containing ordinal numbers, such as "first" and "second," are used to distinguish one from another among various components and are not intended to limit or define the components with such terms.

Throughout the specification, when a part is described as "including" a certain component, it means that, unless there is specific contrary wording, it does not exclude other components, but rather indicates that other components may be further included.

In addition, throughout the specification, when a part is described as being "connected" to another part, this includes not only the case where the parts are "directly connected," but also the case where the parts are "indirectly connected," with another element interposed therebetween.

Hereinafter, embodiments of the present disclosure will be described in detail with reference to the accompanying drawings.

Figure 1:
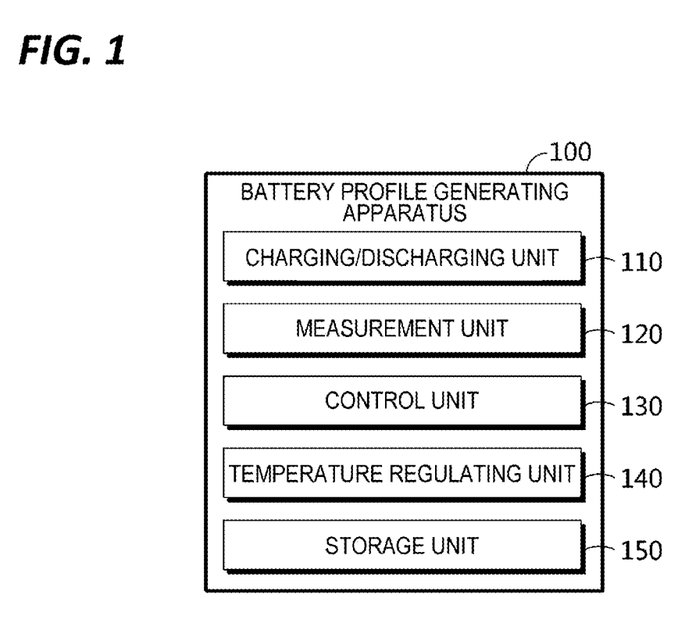
FIG. 1 is a view schematically illustrating a battery profile generating apparatus according to an embodiment of the present disclosure.

FIG. 1 schematically illustrates a battery profile generating apparatus 100, according to an embodiment of the present disclosure.

Referring to FIG. 1, a battery profile generating apparatus 100 may include a charging/discharging unit 110, a measurement unit 120, and a control unit 130, and may further include a temperature adjustment unit 140.

The battery includes a negative electrode terminal and a positive electrode terminal and may refer to a single independent cell that is physically separable. For example, a lithium-ion battery or a lithium polymer battery may be considered as a battery. In addition, the type of the battery may be cylindrical, prismatic, or pouch-type. Furthermore, the battery may also refer to a battery bank, battery module, or battery pack including multiple cells connected in series and/or in parallel. Hereinafter, for the convenience of explanation, the term "battery" will be described as referring to a single independent cell.

The charging/discharging unit 110 may be configured to charge and discharge the battery. For example, the charging/ discharging unit 110 may be electrically connected to the positive electrode terminal and the negative electrode terminal of the battery to charge or discharge the battery.

The charging/discharging unit 110 may be configured to receive a control signal including target current-rate (C-rate) information. For example, the charging/discharging unit 110 may be connected to the control unit 130 to enable wired and/or wireless communication. The wired communication may be, for example, control unit area network (CAN) communication or CAN with Flexible Data Rate (CAN-FD) communication. The wireless communication may be, for example, Zigbee or Bluetooth communication. The type of communication protocol is not particularly limited as long as it supports communication between the charging/discharging unit 110 and the control unit 130. The control unit 130 may transmit a control signal including the target C-rate to the charging/discharging unit 110. The charging/discharging unit 110 may receive the control signal from the control unit 130. The target C-rate information included in the control signal may be set by the control unit 130 or by user input.

The charging/discharging unit 110 may be configured to charge and discharge the battery at the target C-rate included in the control signal. For example, when the target C-rate included in the control signal is 0.2 C, the charging/discharging unit 110 may charge the battery at the C-rate of 0.2 C or discharge the battery at the C-rate of 0.2 C.

The measurement unit 120 may be configured to measure battery information that includes at least one of the voltage, current, and temperature of the battery during a charging and discharging process.

The measurement unit 120 may include a voltage detection circuit. The voltage detection circuit is provided to be electrically connectable to the positive electrode terminal and the negative electrode terminal of the battery. The voltage detection circuit may detect the voltage across the battery by using the potential difference between a pair of sensing lines respectively connected to the positive electrode and the negative electrode of the battery. Through the voltage detection circuit, the measurement unit 120 may measure the voltage of the battery included in the battery information.

The measurement unit 120 may include a current detection circuit. The current detection circuit may be connected in series with the battery via a current path between the battery and the charging/discharging unit 110. The current detection circuit may be connected in series with the battery and the charging/discharging unit 110. For example, the current detection circuit may be implemented using one or a combination of known current detection elements such as a shunt resistor and a Hall effect device. Through the current detection circuit, the measurement unit 120 may measure the charging current of the battery to calculate the charge amount. In addition, through the current detection circuit, the measurement unit 120 may measure the discharging current of the battery to calculate the discharge amount. Through the current detection circuit, the measurement unit 120 may measure the current of the battery included in the battery information.

The measurement unit 120 may include a temperature sensor. The temperature sensor may be provided to be directly attached to or to be spaced apart by a certain distance from the exterior material of the battery. Through the temperature sensor, the measurement unit 120 may measure the battery temperature to be included in the battery information.

The measurement unit 120 may be connected to enable communication with the control unit 130. For example, the measurement unit 120 may be connected to the control unit 130 via wired and/or wireless communication. The wired communication may be, for example, controller area network (CAN) communication or CAN with flexible data (CAN-FD) rate communication. The wireless communication may be, for example, Zigbee or Bluetooth communication. Of course, the type of communication protocol is not particularly limited as long as it supports communication between the measurement unit 120 and the control unit 130. The measurement unit 120 may transmit the measured battery information to the control unit 130. The control unit 130 may receive the battery information from the measurement unit 120.

The control unit 130 may be configured to determine a target temperature and a target C-rate corresponding to charging/discharging conditions based on a preset reference profile that represents the correspondence between a threshold temperature and a threshold C-rate.

Figure 2:
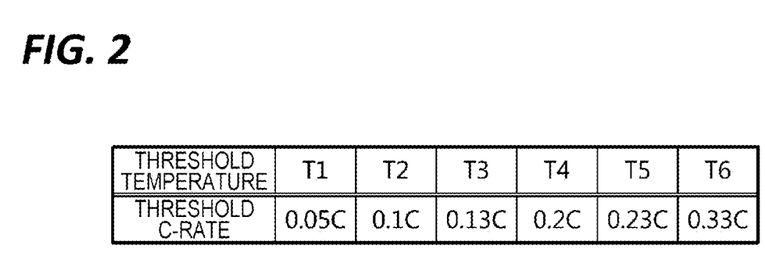
FIG. 2 is a view schematically illustrating an example of a reference profile.

FIG. 2 is a view schematically illustrating an example of a reference profile.

Referring to FIG. 2, the first row represents the threshold temperatures (° C.), and the second row represents the threshold C-rates.

When arranged in the order from the lowest threshold temperature to the highest, the threshold temperatures are T1, T2, T3, T4, T5, and T6. In the reference profile, the threshold temperatures and the threshold C-rates may exhibit a proportional relationship. For example, as the threshold temperatures increase, the threshold C-rates corresponding to the threshold temperatures may also increase. In addition, as the threshold C-rates increase, the threshold temperatures corresponding to the threshold C-rates may also increase.

According to an embodiment of the present disclosure, the charging/discharging conditions may be set to include a target temperature.

The control unit 130 may determine a target C-rate based on the target temperature included in the charging/discharging conditions and a reference profile. For example, when only the target temperature is set as a charging/discharging condition, the control unit 130 may determine the target C-rate based on the reference profile and may set the charging/discharging conditions for the battery.

For example, the control unit 130 may be configured to determine a threshold C-rate corresponding to the target temperature from the reference profile as the target C-rate.

In the embodiment of FIG. 2, when the target temperature included in the charging/discharging conditions is T4, the control unit 130 may determine a threshold C-rate (0.2 C) corresponding to the target temperature T4 from the reference profile as the target C-rate.

As another example, the control unit 130 may be configured to select one or more threshold C-rates corresponding to threshold temperatures from the reference profile that are lower than the target temperature and to determine the minimum C-rate, maximum C-rate, or intermediate C-rate among the selected threshold C-rates as the target C-rate.

The intermediate C-rate may represent the average of the selected one or more threshold C-rates. Alternatively, the intermediate C-rate may represent the median value of the selected one or more threshold C-rates.

Referring to FIG. 2, when the target temperature is T4, the control unit 130 may select one or more threshold C-rates (e.g., 0.05 C, 0.1 C, and 0.13 C) corresponding to threshold temperatures from the reference profile that are lower than the target temperature T4. The control unit 130 may then determine the minimum C-rate (0.05 C), the maximum C-rate (0.13 C), or the intermediate C-rate (e.g., (0.05 C+0.1 C+0.13 C)/3=0.093 C) among the selected threshold C-rates as the target C-rate.

According to another embodiment of the present disclosure, the charging/discharging conditions may be set to include a target C-rate.

The control unit 130 may determine the target temperature based on the target C-rate included in the charging/discharging conditions and the reference profile. For example, when only the target C-rate is set as the charging/discharging condition, the control unit 130 may determine the target temperature based on the reference profile and may set the charging/discharging conditions for the battery.

For example, the control unit 130 may be configured to determine a threshold temperature corresponding to the target C-rate from the reference profile as the target temperature.

In the embodiment of FIG. 2, when the target C-rate included in the charging/discharging conditions is 0.2 C, the control unit 130 may determine the threshold temperature T4 corresponding to the target C-rate 0.2 C from the reference profile as the target temperature.

As another example, the control unit 130 may be configured to select one or more threshold temperatures corresponding to threshold C-rates that are greater than the target C-rate from the reference profile and determine the minimum temperature, maximum temperature, or intermediate temperature among the selected threshold temperatures as the target temperature.

The intermediate temperature may represent the average of the selected one or more threshold temperatures. The intermediate temperature may represent the median value of the selected one or more threshold temperatures.

Referring to FIG. 2, when the target C-rate is 0.2 C, the control unit 130 may select one or more threshold temperatures (e.g., T5 and T6) corresponding to threshold C-rates that are greater than the target C-rate 0.2 C from the reference profile. Then, the control unit 130 may determine the minimum temperature T5, the maximum temperature T6, or the intermediate temperature (e.g., (T5+T6)/2) among the selected threshold temperatures as the target temperature.

The control unit 130 may be configured to control the charging/discharging unit 110 to charge or discharge the battery at the target C-rate when the battery temperature corresponds to the target temperature.

For example, when the battery temperature measured by the measurement unit 120 and included in the battery information reaches the target temperature included in the charging/discharging conditions, the control unit 130 may control the charging/discharging unit 110 to charge or discharge the battery at the target C-rate included in the charging/discharging conditions.

For example, the control unit 130 may transmit a control signal including the charging/discharging conditions to the charging/discharging unit 110. The charging/discharging unit 110 may be configured to charge or discharge the battery at the target C-rate among the charging/discharging conditions included in the received control signal.

The control unit 130 may be configured to generate a battery profile corresponding to the battery based on the battery information.

As long as the battery profile reflects the charging/discharging characteristics of the battery, the parameters constituting the battery profile are not particularly limited.

For example, the battery profile may be a profile representing the correspondence between the voltage and capacity of the battery included in the battery information.

As another example, the battery profile may be a profile representing the correspondence between at least two of the voltage, capacity, and resistance of the battery.

Various known methods may be adopted for calculating the capacity or resistance of the battery.

In general, when charging or discharging is performed at a low C-rate such as 0.05 C, the battery profile may most accurately reflect the current state of the battery. However, since charging or discharging at 0.05 C takes about 20 hours, a significant amount of time is required to generate the battery profile.

Increasing the C-rate reduces the time required to generate the battery profile, but the measured charging/discharging voltage may include an overvoltage. Accordingly, the accuracy of the battery profile decreases due to the overvoltage.

The battery profile generating apparatus 100 according to an embodiment of the present disclosure may reduce the time required to generate the battery profile while improving the accuracy of the battery profile by determining a target temperature and a target C-rate that correspond to each other.

The control unit 130 included in the battery profile generating apparatus 100 may selectively include, for example, a processor, an application-specific integrated circuit (ASIC), another chipset, a logic circuit, a register, a communication modem, and a data processing device, which are known in the art, to execute various control logic performed in the present disclosure. When the control logic is implemented in software, the control unit 130 may be implemented as a set of program modules. In this case, the program modules may be stored in memory and executed by the control unit 130. The memory may be located inside or outside the battery profile generating apparatus 100 and may be connected to the control unit 130 through various well-known means.

The battery profile generating apparatus 100 may further include a storage unit 150. The storage unit 150 may store data or programs necessary for each component of the battery profile generating apparatus 100 to perform its operations and functions, as well as data generated during the execution of such operations and functions. The storage unit 150 is not particularly limited in type as long as it is a known information storage means capable of recording, erasing, updating, and deriving data. As an example, the information storage means may include, for example, random access memory (RAM), flash memory, read-only memory (ROM), electronically erasable programmable read-only memory (EEPROM), and a register. In addition, the storage unit 150 may store program codes defining processes executable by the control unit 130.

The storage unit 150 may store information necessary for the control unit 130 to determine the target temperature and the target C-rate. For example, the storage unit 150 may store, for example, battery information and a reference profile. In addition, the control unit 130 may access the storage unit 150 to obtain the necessary information.

Hereinafter, an embodiment of acquiring a reference profile will be described.

For example, the reference profile may be obtained by analyzing a reference differential profile for a reference battery.

Figure 3:
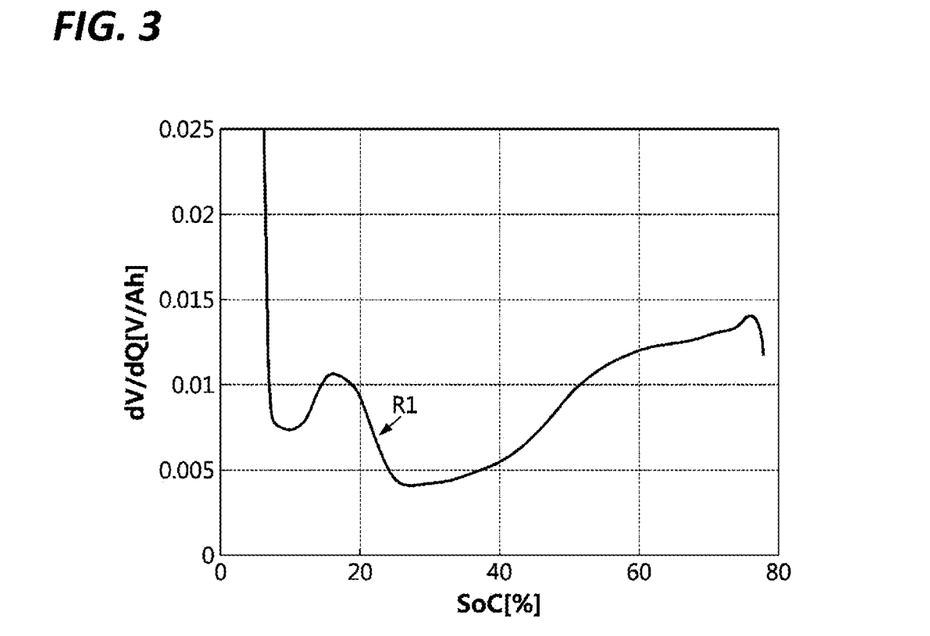
FIG. 3 is a diagram schematically illustrating an example of a reference differential profile.
Figure 4:
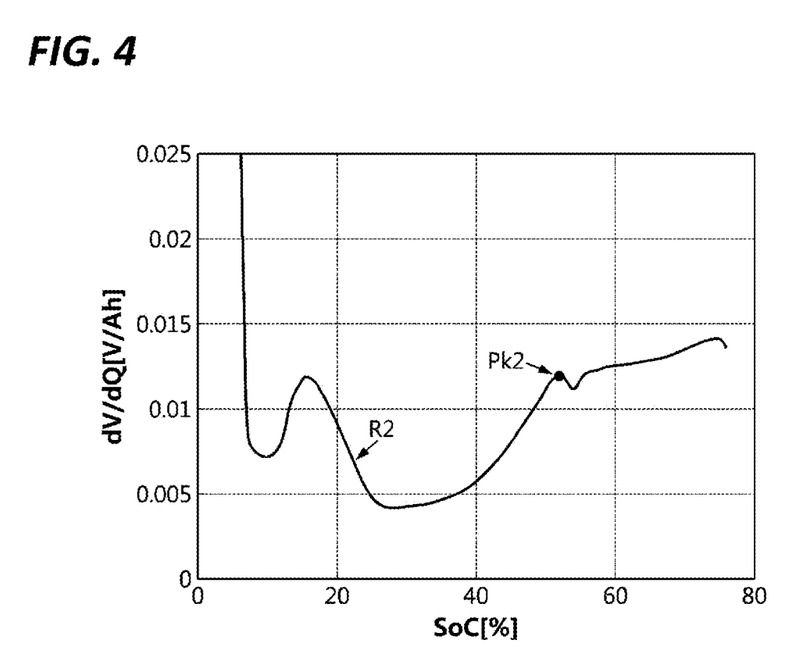
FIG. 4 is a diagram schematically illustrating another example of a reference differential profile.
Figure 5:
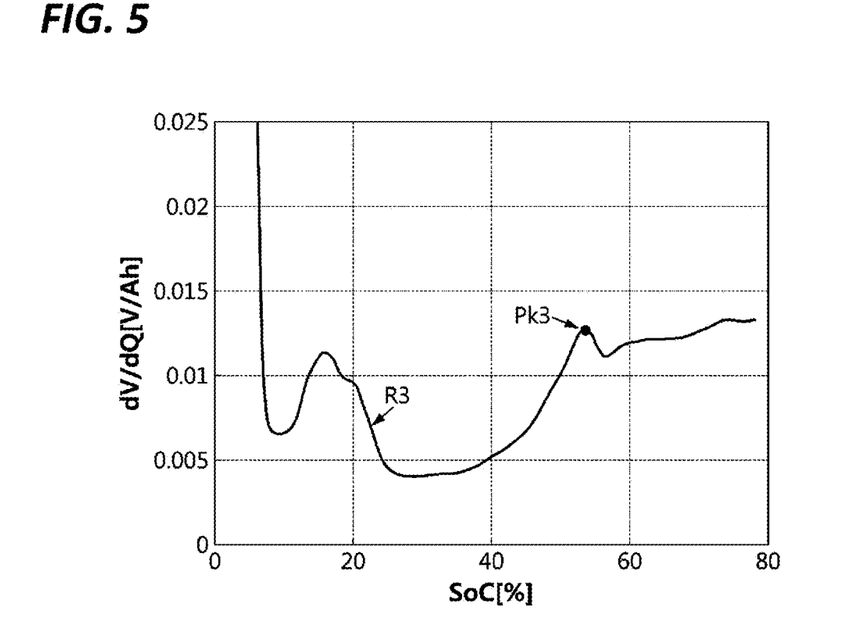
FIG. 5 is a diagram schematically illustrating yet another example of a reference differential profile.

FIG. 3 schematically illustrates an example of a reference differential profile, FIG. 4 schematically illustrates another example of a reference differential profile, and FIG. 5 schematically illustrates yet another example of a reference differential profile.

In each of the embodiments of FIGS. 3 to 5, the horizontal axis (X-axis) represents the state of charge (SOC) (%), and the vertical axis (Y-axis) represents the voltage (V).

The reference battery may be a battery preset to correspond to the battery that is the subject of the present disclosure. For example, the reference battery may be set as a battery having the same specifications as the battery. As another example, the reference battery may be a battery in a beginning of life (BoL) state.

For example, the reference differential profile may be a profile obtained by differentiating a profile representing the correspondence between the voltage and capacity of the battery with respect to voltage. In this case, the reference differential profile may be represented as a graph where the X-axis is voltage (V) and the Y-axis is differential capacity (dQ/dV).

As another example, the reference differential profile may be a profile obtained by differentiating a profile representing the correspondence between the voltage and capacity of the battery with respect to capacity. In this case, the reference differential profile may be represented as a graph where the X-axis is capacity (Q) and the Y-axis is differential voltage (dV/dQ).

According to an embodiment, the reference profile may be obtained based on the presence or absence of peaks in a region of interest of the reference differential profile.

The region of interest may be predetermined. In addition, the region of interest may be predetermined based on the characteristics of the battery.

For example, the region of interest may be predetermined based on the characteristics of the positive electrode or the negative electrode of the battery. The region of interest may include an SOC range or a voltage range where a specific peak representing the characteristics of the positive electrode or the negative electrode of the battery is present.

As another example, the region of interest may be predetermined based on the types or the number of electrode active materials. The region of interest may include an SOC range or a voltage range where a specific peak representing the characteristics of the electrode active material is present.

As yet another example, the region of interest may be predetermined based on the capacity utilization range of each active material included in the electrodes of the battery.

For example, the region of interest may be a specific SOC range (e.g., an SOC range of 40% to 60%). As another example, the region of interest may be a specific voltage range (e.g., a voltage range of 3.7 V to 3.9 V).

A peak may refer to a local maximum or minimum point of a reference differential profile. For example, a peak may indicate an inflection point in a profile representing the correspondence between the charging/discharging characteristics of the battery.

Referring to FIG. 3, the reference differential profile R1 is a profile obtained by charging and discharging the reference battery under charging/discharging conditions (e.g., 25° C., 0.2 C). Referring to FIG. 4, the reference differential profile R2 is a profile obtained by charging and discharging the reference battery under charging/discharging conditions (e.g., 45° C., 0.2 C). Referring to FIG. 5, the reference differential profile R3 is a profile obtained by charging and discharging the reference battery under charging/discharging conditions (e.g., 25° C., 0.13 C).

A peak may appear in a predetermined region of interest within the reference differential profile when the battery temperature is increased while maintaining the charging/discharging C-rate. Alternatively, a peak may appear in a predetermined region of interest within the reference differential profile when the charging/discharging C-rate is decreased while maintaining the battery temperature.

In each of the embodiments of FIGS. 3 to 5, the region of interest may be an SOC range of 40% to 60%. In the region of interest, no peak is present on the reference differential profile R1. A peak Pk2 is present in the region of interest on the reference differential profile R2. A peak Pk3 is present in the region of interest on the reference differential profile R3.

A threshold C-rate corresponding to a threshold temperature from the reference profile may refer to the maximum C-rate at which a peak is present in the region of interest of the reference differential profile when the battery temperature is at the threshold temperature. For example, when charging or discharging the battery at the threshold C-rate, no peak may be present in the region of interest of the reference differential profile when the battery temperature is lower than the threshold temperature. When charging or discharging the battery at the threshold C-rate, a peak may be present in the region of interest of the reference differential profile when the battery temperature is at or above the threshold temperature.

A threshold temperature corresponding to a threshold C-rate from the reference profile may refer to the minimum temperature at which a peak is present in the region of interest of the reference differential profile when charging or discharging the battery at the threshold C-rate. For example, when the battery temperature is at the threshold temperature, a peak may be present in the region of interest of the reference differential profile when the battery is charged or discharged at a C-rate lower than the threshold C-rate. When the battery temperature is at the threshold temperature, no peak may be present in the region of interest of the reference differential profile when the battery is charged or discharged at the threshold C-rate or higher.

According to another embodiment of the present disclosure, the charging/discharging conditions may be set to include a target temperature and a target C-rate.

The control unit 130 may be configured to determine the charging/discharging suitability according to the target temperature and the target C-rate based on the reference profile. When the charging/discharging is determined to be suitable, the control unit 130 may control the charging/discharging unit 110 to charge or discharge the battery.

Here, determining that the charging/discharging according to the target temperature and the target C-rate is suitable may mean that generating the battery profile during the charging/discharging process under the corresponding charging/discharging conditions is suitable. Determining that the charging/discharging according to the target temperature and the target C-rate is unsuitable may mean that generating the battery profile during the charging/discharging process under the corresponding charging/discharging conditions is unsuitable.

When the charging/discharging according to the target temperature and the target C-rate is determined to be suitable, the control unit 130 may control the charging/discharging unit 110 to charge or discharge the battery at the target temperature and the target C-rate. When the charging/discharging is determined to be unsuitable, the control unit 130 may control the charging/discharging unit 110 to prevent the battery from being charged or discharged. When the charging/discharging according to the target temperature and the target C-rate is determined to be unsuitable, the control unit

130 may control the charging/discharging unit 110 to prevent the battery from being charged or discharged.

The control unit 130 may be configured to determine a threshold C-rate corresponding to the target temperature from the reference profile as a reference C-rate and to determine that the charging/discharging is suitable when the reference C-rate is equal to or greater than the target C-rate. When the reference C-rate is less than the target C-rate, the control unit 130 may determine that the charging/discharging under the set charging/discharging conditions is unsuitable.

For example, the reference C-rate is the threshold C-rate corresponding to the target temperature and may refer to the maximum C-rate at which a peak may be present in the region of interest of the reference differential profile when the battery temperature is at the target temperature.

When the reference C-rate is equal to or greater than the target C-rate, a peak may be present in the region of interest of the differential profile based on the battery information measured during the charging/discharging process according to the target temperature and the target C-rate. Accordingly, the control unit 130 may determine that the charging/discharging according to the target temperature and the target C-rate is suitable.

When the reference C-rate is less than the target C-rate, no peak may be present in the region of interest of the differential profile based on the battery information measured during the charging/discharging process according to the target temperature and the target C-rate. Accordingly, the control unit 130 may determine that the charging/discharging according to the target temperature and the target C-rate is unsuitable.

In the embodiment of FIG. 2, when the target temperature included in the charging/discharging conditions is T4 and the target C-rate is 0.13 C, the control unit 130 may determine 0.2 C, which is the threshold C-rate corresponding to the target temperature T4 from the reference profile, as the reference C-rate. Since the reference C-rate 0.2 C is equal to or greater than the target C-rate 0.13 C, the control unit 130 may determine that the charging/discharging according to the target temperature and the target C-rate included in the set charging/discharging conditions is suitable.

The control unit 130 may be configured to determine a threshold temperature corresponding to the target C-rate from the reference profile as the reference temperature and to determine that the charging/discharging is suitable when the reference temperature is equal to or less than the target temperature. When the reference temperature exceeds the target temperature, the control unit 130 may determine that the charging/discharging of the battery under the set charging/discharging conditions is unsuitable.

For example, the reference temperature is a threshold temperature corresponding to the target C-rate and may refer to the minimum temperature at which a peak may be present in the region of interest of the reference differential profile when the battery is charged or discharged at the target C-rate.

When the reference temperature is equal to or less than the target temperature, a peak may be present in the region of interest of the differential profile obtained during charging/discharging according to the target temperature and the target C-rate. Accordingly, the control unit 130 may determine that the charging/discharging according to the target temperature and the target C-rate is suitable. When the reference temperature exceeds the target temperature, no peak may be present in the region of interest of the differential profile obtained during charging/discharging according to the target temperature and the target C-rate. Accordingly, the control unit 130 may determine that the charging/discharging according to the target temperature and the target C-rate is unsuitable.

In the embodiment of FIG. 2, when the target temperature included in the charging/discharging conditions is T4 and the target C-rate is 0.13 C, the control unit 130 may determine T3, which is the threshold temperature corresponding to the target C-rate (0.13 C), as the reference temperature. Since the reference temperature T3 is equal to or less than the target temperature T4, the control unit 130 may determine that the charging/discharging according to the target temperature and the target C-rate included in the set charging/discharging conditions is suitable.

The profile generating apparatus 100 may further include a temperature regulating unit 140 configured to regulate the battery temperature.

The control unit 130 may be configured to control the temperature regulating unit 140 until the battery temperature reaches the target temperature when the battery temperature does not correspond to the target temperature.

For example, the temperature regulating unit 140 may directly or indirectly heat or cool the battery to maintain the battery temperature within a predetermined range before the charging/discharging unit 110 charges or discharges the battery according to the charging/discharging conditions.

For instance, the temperature regulating unit 140 may heat the battery using a coil. The temperature regulating unit 140 may regulate the temperature generated by the resistance of the coil by controlling the intensity of the current flowing through the coil. As another example, the temperature regulating unit 140 may include a heat exchanger and may heat or cool the battery using a fluid flowing through heat exchange piping. The temperature regulating unit 140 may be implemented without limitation as long as it is a device capable of regulating the battery temperature.

The temperature regulating unit 140 may be connected to the control unit 130 to enable wired and/or wireless communication.

For example, the control unit 130 may compare the battery information with the charging/discharging conditions and control the temperature regulating unit 140 based on the comparison result.

When the battery temperature is lower than the target temperature, the control unit 130 may control the temperature regulating unit 140 to directly or indirectly heat the battery. The temperature regulating unit 140 may heat the battery until the battery temperature reaches the target temperature within a predetermined error range.

The profile generating apparatus 100, which includes the temperature regulating unit 140, may control the battery temperature to reach the target temperature before proceeding with charging/discharging. A peak may be present in the region of interest of the differential profile based on the battery information measured during the charging/discharging process. With the profile generating apparatus 100, even a low-temperature battery may be charged or discharged after increasing its temperature, which may enable generation of a battery profile that more accurately reflects the state of the battery.

When the battery temperature is higher than the target temperature, the control unit 130 may control the temperature regulating unit 140 to directly or indirectly cool the battery. The temperature regulating unit 140 may cool the battery until the battery temperature reaches the target temperature within a predetermined error range.

For example, as the battery temperature increases, the stress applied to the battery during the charging/discharging process may increase. When charging/discharging is performed at a high temperature, the battery may degrade more than when charging/discharging is performed at a low temperature. Accordingly, when the battery temperature is higher than the target temperature, the control unit 130 may control the temperature regulating unit 140 so that the battery temperature corresponds to the target temperature.

The profile generating apparatus 100 may perform charging/discharging after cooling the battery temperature to correspond to the target temperature to prevent the battery from degrading due to high-temperature charging/discharging. Therefore, according to an embodiment of the present disclosure, the battery may degrade less during the charging/discharging process, thereby increasing the expected lifespan of the battery.

The control unit 130 may be configured to provide information about the battery by outputting the battery profile externally.

For example, the control unit 130 may be connected via wired and/or wireless communication to an external device capable of diagnosing the state of the battery based on the battery profile. The control unit 130 may transmit the battery profile to the external device via wired and/or wireless communication. For example, the external device may include a diagnostic device or a server, and may be applied without limitation as long as it is a device capable of analyzing the battery profile to diagnose the state of the battery.

The profile generating apparatus 100 according to the present disclosure may be applied to a battery management system (BMS). For example, the BMS, according to the present disclosure, may include the aforementioned profile generating apparatus 100. In this configuration, at least some of individual components of the profile generating apparatus 100 may be implemented by supplementing or adding functions to the configurations included in a conventional BMS. For example, the charging/discharging unit 110, the measurement unit 120, the control unit 130, the temperature regulating unit 140, and the storage unit 150 of the profile generating apparatus 100 may be implemented as components of the BMS.

In addition, the profile generating apparatus 100, according to the present disclosure, may be provided in a battery pack. For example, the battery pack according to the present disclosure may include the aforementioned profile generating apparatus 100 and one or more battery cells. The battery pack may further include electrical components (e.g., a relay and a fuse) and a case.

Figure 6:
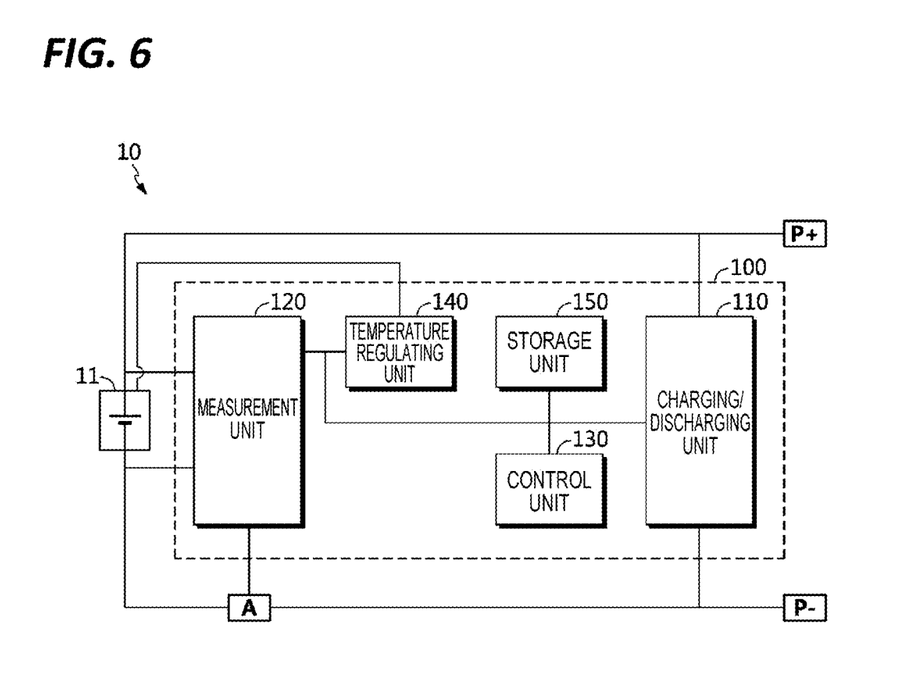
FIG. 6 is a view illustrating the configuration of a battery pack, according to another embodiment of the present disclosure.

FIG. 6 illustrates an example configuration of a battery pack 10 according to another embodiment of the present disclosure.

The positive electrode terminal of a battery 11 may be connected to the positive electrode terminal (P+) of the battery pack 10, and the negative electrode terminal of the battery 11 may be connected to the negative electrode terminal (P−) of the battery pack 10.

The positive electrode terminal (P+) of the battery pack 10 may be connected to one side of the charging/discharging unit 110, and the negative electrode terminal (P−) of the battery pack 10 may be connected to the other side of the charging/discharging unit 110.

The battery pack 10 may be configured to provide a battery profile to a diagnostic device or a server. For example, the diagnostic device or the server may be a device or a server configured to diagnose the state of a battery based on a battery profile.

The profile generating apparatus 100 according to the present disclosure may be provided in a diagnostic device (not illustrated). The diagnostic device, according to the present disclosure, may include the aforementioned profile generating apparatus 100. The diagnostic device may charge and discharge a battery while diagnosing the state of the battery. For example, the diagnostic device may be configured to generate a battery profile representing the charging/discharging characteristics of the battery and to diagnose the state of the battery using the generated battery profile.

According to an embodiment, the battery profile generated by the profile generating apparatus 100 may precisely reflect various state changes occurring during the charging/discharging process of the battery. For example, the battery profile may accurately indicate conditions such as internal resistance increase, capacity degradation, overcharging, and overvoltage. This battery profile may be effectively used to analyze the degradation mechanism of the battery and diagnose its state.

For example, based on the battery profile, the diagnostic device may quantitatively diagnose the amount of available lithium loss due to, for example, solid electrolyte interphase (SEI) layer formation or side reactions. As another example, based on the battery profile, the diagnostic device may quantitatively diagnose the degradation state of each electrode by calculating the loss of active materials in the positive and negative electrodes. As yet another example, based on the battery profile, the diagnostic device may diagnose the battery's state of health (SOH) by considering capacity degradation, internal resistance increase, and/or voltage characteristic changes. As still another example, based on the battery profile, the diagnostic device may estimate the amount of gas generated due to electrolyte decomposition.

The more accurately a battery profile reflects the current state of a battery, the more precisely the state of the battery may be diagnosed based on the battery profile. Since the profile generating apparatus 100 generates a battery profile based on a reference profile, a battery profile that reflects the current state of a battery may be quickly generated. Accordingly, by diagnosing the state of the battery using the battery profile generated by the profile generating apparatus 100, the time required for diagnosing the state of the battery may be significantly reduced while improving diagnostic accuracy. In addition, an accurate diagnosis enables effective control to extend the battery's lifespan and to ensure safety.

Figure 7:
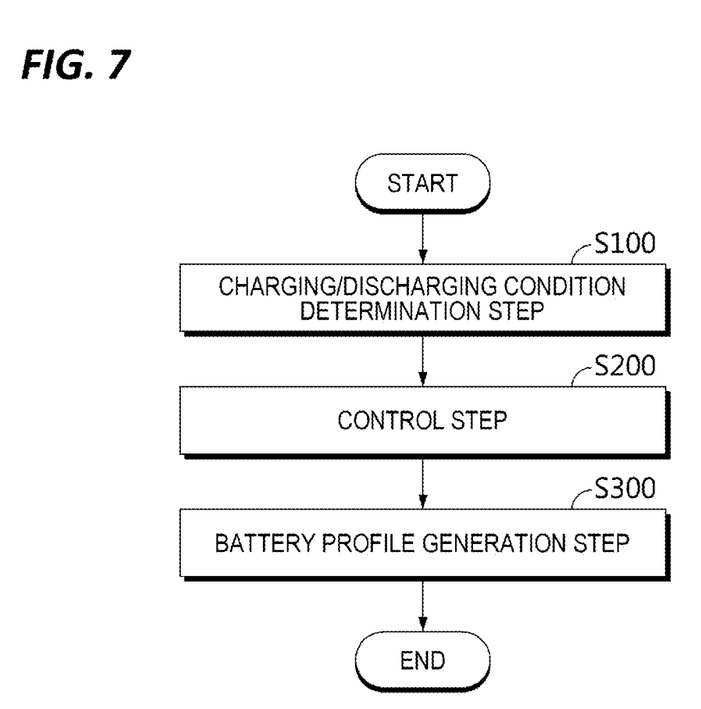
FIG. 7 is a view schematically illustrating a battery profile generating method, according to another embodiment of the present disclosure.

FIG. 7 is a view schematically illustrating a battery profile generating method according to another embodiment of the present disclosure.

Referring to FIG. 7, the battery profile generating method may include a charging/discharging condition determination step (S100), a control step (S200), and a battery profile generation step (S300).

Each step of the battery profile generating method may be performed by the profile generating apparatus 100. Hereinafter, for convenience of explanation, descriptions that overlap those described above will be omitted or briefly explained.

The charging/discharging condition determination step (S100) is a step of determining a target temperature and a target C-rate corresponding to the charging/discharging conditions based on a preset reference profile that represents the correspondence between a threshold temperature and a threshold C-rate. This step may be performed by the control unit 130.

The charging/discharging conditions may be set to include a target temperature. The control unit 130 may determine the target C-rate based on the target temperature included in the charging/discharging conditions and the reference profile.

For example, the control unit 130 may be configured to determine a threshold C-rate corresponding to the target temperature from the reference profile as the target C-rate.

The charging/discharging conditions may be set to include a target C-rate. The control unit 130 may determine the target temperature based on the target C-rate included in the charging/discharging conditions and the reference profile.

For example, the control unit 130 may be configured to determine a threshold temperature corresponding to the target C-rate from the reference profile as the target temperature.

As another example, the control unit 130 may be configured to select one or more threshold temperatures corresponding to threshold C-rates that are greater than the target C-rate from the reference profile and determine the minimum temperature, maximum temperature, or intermediate temperature among the selected threshold temperatures as the target temperature.

The control step (S200) is a step of controlling the charging/discharging unit 110 to charge or discharge the battery at the target C-rate when the battery temperature corresponds to the target temperature. This step may be performed by the control unit 130.

For example, the control unit 130 may transmit a control signal including the charging/discharging conditions to the charging/discharging unit 110. The charging/discharging unit 110 may be configured to charge or discharge the battery at the target C-rate among the charging/discharging conditions included in the received control signal.

The battery profile generation step (S300) is a step of generating a battery profile corresponding to the battery based on battery information that includes at least one of the voltage, current, and temperature of the battery. This step may be performed by the control unit 130.

As long as the battery profile reflects the charging/discharging characteristics of the battery, the parameters constituting the battery profile are not particularly limited.

The above-described embodiments of the present disclosure are not limited to being implemented solely through apparatuses and methods, but may also be implemented through a program that realizes the functions corresponding to the configuration of the embodiments of the present disclosure or through a recording medium on which such a program is recorded. This may be readily implemented by a person ordinarily skilled in the technical field to which the present disclosure belongs based on the description of the embodiments described above.

While the present disclosure has been described above with reference to several embodiments and drawings, the present disclosure is not limited thereto, and various changes and modifications can be made by a person ordinarily skilled in the art to which the present disclosure pertains without departing from the technical spirit of the present disclosure and the equivalent scope of the claims to be described below.

In addition, since various substitutions, modifications, and changes can be made to the present disclosure as described above without departing from the technical spirit of the present disclosure by a person ordinarily skilled in the art to which the present disclosure pertains, the present disclosure is not limited to the above-described embodiments and the accompanying drawings, but all or some of the respective embodiments can be selectively combined so that various modifications can be made.

DESCRIPTION OF SYMBOL

10: Battery Pack
100: Battery profile generating apparatus
110: Charging/Discharging Unit
120: Measurement Unit
130: Control unit
140: Temperature Regulating Unit
150: Storage Unit

What is claimed is:

1. A battery profile generating apparatus comprising:
   a charging/discharging unit configured to charge and discharge a battery;
   a measurement unit configured to measure battery information that includes at least one of the voltage, current, and temperature of the battery during the charging/discharging process; and
   a control unit configured to:
   determine a target temperature and a target C-rate corresponding to charging/discharging conditions based on a preset reference profile that represents the correspondence between a threshold temperature and a threshold C-rate;
   control the charging/discharging unit to charge or discharge the battery at the target C-rate when the battery temperature corresponds to the target temperature; and
   generate a battery profile corresponding to the battery based on the battery information, wherein the reference profile is preset based on a reference differential profile of a reference battery.

2. The battery profile generating apparatus according to claim 1, wherein the charging/discharging conditions is set to include the target temperature, and
   the control unit is configured to determine a threshold C-rate corresponding to the target temperature from the reference profile as the target C-rate.

3. The battery profile generating apparatus according to claim 1, wherein the control unit is configured to determine the minimum C-rate, maximum C-rate, or intermediate C-rate from among the one or more threshold C-rates corresponding to threshold temperatures from the reference profile that are lower than the target temperature, as the target C-rate.

4. The battery profile generating apparatus according to claim 1, wherein the charging/discharging conditions is set to include the target C-rate, and
   the control unit is configured to determine a threshold temperature corresponding to the target C-rate from the reference profile as the target temperature.

5. The battery profile generating apparatus according to claim 4, wherein the control unit is configured to: select one or more threshold temperatures corresponding to threshold C-rates from the reference profile that are greater than the target C-rate; and determine the minimum temperature, maximum temperature, or intermediate temperature from among the selected one or more threshold temperatures, as the target temperature.

6. The battery profile generating apparatus according to claim 1, wherein the charging/discharging conditions is set to include the target temperature and the target C-rate, and the control unit is configured to: determine the charging/discharging suitability according to the target temperature and the target C-rate based on the reference profile; and control the charging/discharging unit to charge or discharge the battery when the charging/discharging is determined to be suitable.

7. The battery profile generating apparatus according to claim 6, wherein the control unit is configured to: determine the threshold C-rate corresponding to the target temperature from the reference profile as a reference C-rate; and determine that the charging/discharging is suitable when the reference C-rate is equal to or greater than the target C-rate.

8. The battery profile generating apparatus according to claim 6, wherein the control unit is configured to: determine the threshold temperature corresponding to the target C-rate from the reference profile as a reference temperature; and determine that the charging/discharging is suitable when the reference temperature is equal to or less than the target temperature.

9. The battery profile generating apparatus according to claim 1, further comprising a temperature regulating unit configured to regulate the battery temperature,
wherein the control unit is configured to control the temperature regulating unit until the battery temperature reaches the target temperature when the battery temperature does not correspond to the target temperature.

10. The battery profile generating apparatus according to claim 1, wherein the control unit is configured to provide information about the battery by outputting the battery profile externally.

11. A battery pack comprising the battery profile generating apparatus according to claim 1.

12. A diagnostic device comprising the battery profile generating apparatus according to claim 1.

13. A battery profile generating method comprising:
determining a target temperature and a target C-rate corresponding to charging/discharging conditions based on a preset reference profile that represents the correspondence between a threshold temperature and a threshold C-rate;
controlling a charging/discharging unit to charge or discharge the battery at the target C-rate when the battery temperature corresponds to the target temperature; and
generating a battery profile corresponding to the battery based on battery information that includes at least one of the voltage, current, and temperature of the battery, wherein the reference profile is preset based on a reference differential profile of a reference battery.

14. A non-transitory computer-readable storage medium having stored therein a program that causes a computer to execute a battery profile generating method, the method comprising:
determining a target temperature and a target C-rate corresponding to charging/discharging conditions based on a preset reference profile that represents the correspondence between a threshold temperature and a threshold C-rate;
controlling a charging/discharging unit to charge or discharge the battery at the target C-rate when the battery temperature corresponds to the target temperature; and
generating a battery profile corresponding to the battery based on battery information that includes at least one of the voltage, current, and temperature of the battery, wherein the reference profile is preset based on a reference differential profile of a reference battery.

* * * * *